(12) United States Patent
Ueno et al.

(10) Patent No.: US 8,542,931 B2
(45) Date of Patent: Sep. 24, 2013

(54) RULED LINE EXTRACTION TECHNIQUE BASED ON COMPARISION RESULTS AND INDENTIFYING NOISE BASED ON LINE THICKNESS

(75) Inventors: Kunikazu Ueno, Kanagawa (JP); Shinichi Yada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 676 days.

(21) Appl. No.: 12/552,627

(22) Filed: Sep. 2, 2009

(65) Prior Publication Data

US 2010/0195915 A1 Aug. 5, 2010

(30) Foreign Application Priority Data

Feb. 5, 2009 (JP) ................................. 2009-024443

(51) Int. Cl.
*G06K 9/66* (2006.01)
*G06K 9/00* (2006.01)
*G06K 9/40* (2006.01)

(52) U.S. Cl.
USPC ............................ 382/194; 382/113; 382/260

(58) Field of Classification Search
None
See application file for complete search history.

(56) References Cited

U.S. PATENT DOCUMENTS 5,729,635 A * 3/1998 Fast et al. ....................... 382/254
5,923,782 A * 7/1999 Chhabra et al. ............... 382/202
6,327,387 B1 * 12/2001 Naoi et al. ..................... 382/190
6,798,906 B1 * 9/2004 Kato .............................. 382/176
2001/0031085 A1 * 10/2001 Katsuyama ................... 382/202

FOREIGN PATENT DOCUMENTS

| JP | A-2-210586 | 8/1990 |
|---|---|---|
| JP | A-5-54189 | 3/1993 |
| JP | A-6-96274 | 4/1994 |
| JP | A-09-282414 | 10/1997 |
| JP | A-10-49676 | 2/1998 |
| JP | A-11-242716 | 9/1999 |
| JP | A-2000-48121 | 2/2000 |
| JP | A-2000-082110 | 3/2000 |
| JP | A-2000-222577 | 8/2000 |
| JP | A-2000-259826 | 9/2000 |
| JP | A-2004-158041 | 6/2004 |

OTHER PUBLICATIONS

Oct. 23, 2012 Office Action issued in Japanese Application No. 2009-024443 (with translation).

* cited by examiner

*Primary Examiner* — David Zarka
*Assistant Examiner* — Jhere Rowland
(74) *Attorney, Agent, or Firm* — Oliff & Berridge, PLC (57) ABSTRACT

An image processing apparatus includes: a ruled line extracting unit that counts the number of pixels within an image, compares the counted number of pixels with a threshold value, and extracts a ruled line based on a result of the comparison; and an identifying unit that identifies a noise component in the ruled line extracted by the ruled line extracting unit based on thickness of the ruled line extracted by the ruled line extracting unit and the threshold value.

10 Claims, 11 Drawing Sheets

RULED LINE EXTRACTION TECHNIQUE BASED ON COMPARISION RESULTS AND INDENTIFYING NOISE BASED ON LINE THICKNESS

CROSS-REFERENCE TO RELATED APPLICATIONS

This application is based on and claims priority under 35 USC 119 from Japanese Patent Application No. 2009-024443 filed on Feb. 5, 2009.

BACKGROUND

1. Technical Field

The present invention relates to an image processing apparatus and a computer readable medium.

2. Related Art

As a related art, there is a technique for reading a paper document by means of scanning or the like, analyzing a layout or configuration objects and reusing its description information or performing a process based on the description information. In particular, a form, which is a kind of document, is frequently used in business. The form is mostly configured by a chart, requiring a technique for analyzing the chart.

SUMMARY

According to an aspect of the invention, an image processing apparatus includes: a ruled line extracting unit that counts the number of pixels within an image, compares the counted number of pixels with a threshold value, and extracts a ruled line based on a result of the comparison; and an identifying unit that identifies a noise component in the ruled line extracted by the ruled line extracting unit based on thickness of the ruled line extracted by the ruled line extracting unit and the threshold value.

BRIEF DESCRIPTION OF THE DRAWINGS

Exemplary embodiments of the present invention will be described in detail based on the following figures, wherein.

DETAILED DESCRIPTION

Hereinafter, an exemplary embodiment adaptable for implementation of the present invention will be described with reference to the drawings.

Figure 1:
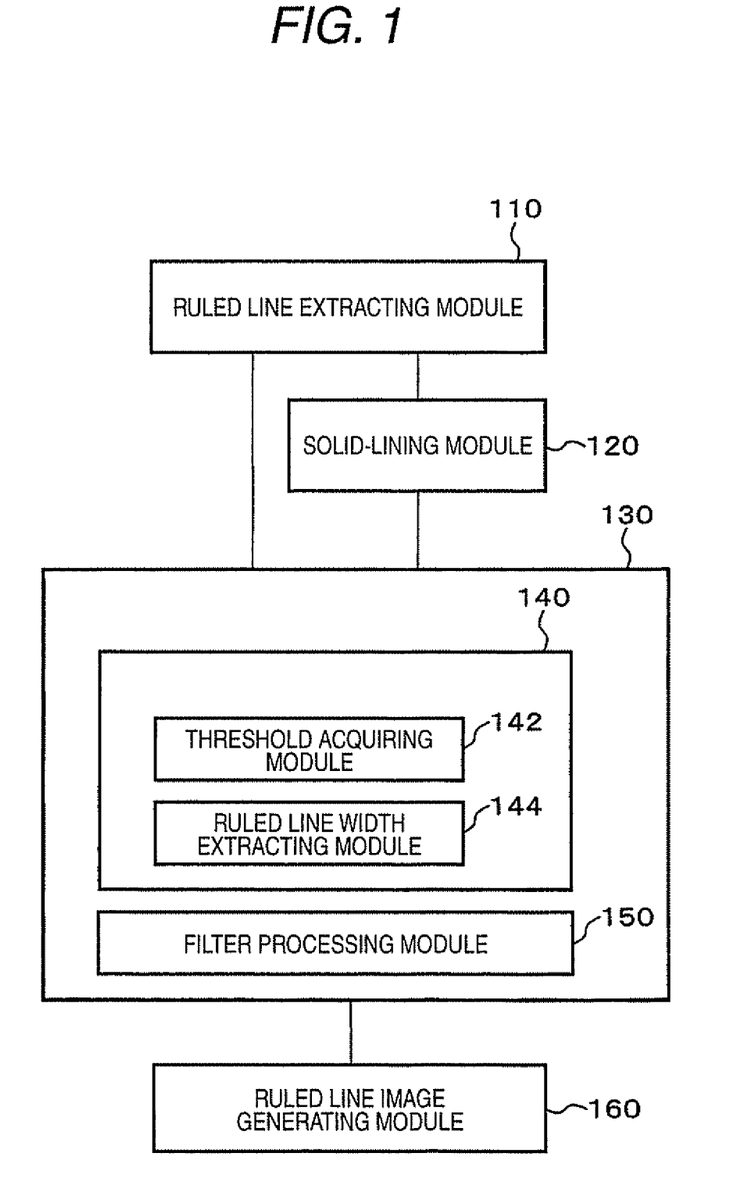
FIG. 1 is a conceptual module configuration view of an exemplary configuration of this exemplary embodiment.

FIG. 1 is a conceptual module configuration view of a configuration of this exemplary embodiment.

A "module" used herein refers generally to a part such as logically separable software (computer program), hardware and so on. Accordingly, a module in this exemplary embodiment includes not only a module in a computer program but also a module in hardware configuration. Thus, this exemplary embodiment addresses computer program, system and method. For the convenience of description, as used herein, "store," "be stored" or its equivalent unit that a computer program is stored in a storage device or is controlled to be stored in a storage device. Although the module is in substantial one-to-one correspondence to function, for mounting, one module may be configured as one program, plural modules may be configured as one program, or one module may be configured as a plural programs. Plural modules may be executed by one computer, or one module may be executed by a plural computers in distributed or parallel environments. One module may contain other modules. As used herein, the term "connection" includes logical connection (data delivery, instruction, reference relation between data, etc) in addition to physical connection.

As used herein, the term "system" or "apparatus" may include one computer, hardware, apparatus or the like in addition to plural computers, hardware, apparatuses and the like interconnected via a communication unit such as a network (including one-to-one correspondence communication connection). In the specification, "apparatus" is synonymous with "system." As used herein, the term "predetermined" means determination before an object process, including not only determination before start of processing by the exemplary embodiment but also determination according to situations and conditions at that time or situations and conditions up to that time if only this determination is the determination before an object process even after start of processing by the exemplary embodiment.

An image processing apparatus of this exemplary embodiment analyzes an image ruled lines including and includes a ruled line extracting module 110, a solid-lining module 120, a noise identifying/removing module 130 and a ruled line image generating module 160, as shown in FIG. 1.

The ruled line extracting module 110 is connected to the solid-lining module 120 and the noise identifying/removing module 130. The ruled line extracting module 110 counts the number of pixels in an object image, compares the counted number of pixels with a threshold value to extract a ruled line, and passes a result of the extraction to the solid-lining module 120 and the noise identifying/removing module 130. For example, the ruled line extracting module 110 takes projection in the horizontal and vertical directions, prepares the horizontal and vertical histograms, and extracts coordinate values at positions higher than a predetermined threshold value as ruled lines in the horizontal and vertical directions from each histogram in the horizontal and vertical directions.

In addition, here, the extracted ruled lines are ruled line candidates, which may include noise components (extracted as ruled lines although they are unruled lines) to be identified and removed by the noise identifying/removing module 130.

The horizontal direction and the vertical direction may be either a horizontal direction (scan direction) and a vertical direction (sub scan direction) in an image or a horizontal direction and a vertical direction in a ruled line.

The object pixels counted by the ruled line extracting module 110 may be either black or white pixels. This exemplary embodiment shows an example of counting the number of black pixels, that is, takes a chart having black ruled lines as an object.

The threshold value to be compared with the number of pixels is a predetermined value. As used herein, the term "predetermined" may be meant to be anytime before the number of pixels is compared with the threshold value for extraction of ruled lines. Particularly, after the number of black pixels is counted, the threshold value may be defined based on the counted number of black pixels. For example, the threshold value may be defined by multiplying the maximum of the counted number of black pixels by a predetermined rate. In addition, the threshold value may be defined from the number of black pixels when the predetermined number of black pixels is selected in a descending order from a larger one of the counted numbers of black pixels. In addition, when the numbers of black pixels are sorted and there is a difference larger than a predetermined number between the object number of black pixels and the next number of black pixels, the threshold value may be defined from the object number of black pixels.

The solid-lining module 120 is connected to the ruled line extracting module 110 and the noise identifying/removing module 130. The ruled lines extracted by the ruled line extracting module 110 are converted into solid lines. That is, dotted lines, dashed lines or the like constituting the ruled lines are converted into the solid lines. Then, an image of the ruled lines rendered into the solid lines is passed on to the noise identifying/removing module 130. For example, the image is expanded and then contracted in the vertical or horizontal direction. Alternatively, the image may be separately processed in the vertical and horizontal directions. That is, an image determined to have a vertical ruled line may be expanded and then contracted in the vertical direction. Similarly, an image determined to have a horizontal ruled line may be expanded and then contracted in the horizontal direction. This renders a discontinued ruled line, such as a dotted line or a dashed line, into a solid line.

In addition, the solid-lining module 120 may be omitted. For example, when there is no ruled line such as a dotted line or a dashed line (a ruled line is configured by only a solid line), a process by the solid-lining module 120 is unnecessary.

The noise identifying/removing module 130 is connected to the ruled line extracting module 110, the solid-lining module 120 and the ruled line image generating module 160 and includes a filter generating module 140 and a filter processing module 150. Based on the thickness of the ruled line extracted by the ruled line extracting module 110 and the threshold value, the noise identifying/removing module 130 identifies and removes noise components (hereinafter abbreviated as "noise") contained in the ruled line extracted by the ruled line extracting module 110, and then passes a result of the process, that is, a ruled line image without the noise, to the ruled line image generating module 160. For example, the noise identifying/removing module 130 controls the filter generating module 140 and the filter processing module 150 to identify and remove noise from the ruled line. More specifically, the filter generating module 140 is controlled to generate a filter having a size larger than the noise based on the thickness of the ruled line extracted by the ruled line extracting module 110 and the threshold value used by the ruled line extracting module 110. Then, the filter processing module 150 is controlled to remove the noise from the ruled line through the filter. As used herein, the filter refers to one generally called "filter" in the field of image processing.

The filter generating module 140 includes a threshold acquiring module 142 and a ruled line width extracting module 144. The filter generating module 140 controls the threshold acquiring module 142 and the ruled line width extracting module 144 to generate a filter for removing the noise, and then passes the generated filter to the filter processing module 150. For example, the filter generating module 140 obtains the threshold value from the threshold acquiring module 142 and the width of the ruled line from the ruled line width extracting module 144 and generates the filter using a value smaller than the threshold value and a value larger than the width. More specifically, the filter for removing the noise from the ruled line may have the form of a rectangle and one side of the rectangle may be longer than the thickness of the ruled line extracted by the ruled line extracting module 110. In addition, the other side of the rectangle may be shorter than the threshold value used by the ruled line extracting module 110. However, both sides do not have to be shorter than the noise. Even more specifically, the filter for removing the noise from the horizontal ruled line has the form of a rectangle, the vertical length of the filter is more than the thickness of the ruled line and the horizontal width of the filter is less than the threshold value, while the filter for removing the noise from the vertical ruled line has the form of a rectangle, the vertical length of the filter is less than the threshold value and the horizontal width of the filter is more than the thickness of the ruled line.

The threshold acquiring module 142 acquires the threshold value used by the ruled line extracting module 110 to extract the ruled line from the ruled line extracting module 110.

The ruled line width extracting module 144 extracts the width (the horizontal width measured in the horizontal direction for the vertical ruled line or the vertical width measured in the vertical direction for the horizontal ruled line) of the ruled line extracted by the ruled line extracting module 110. A larger one of the widths of the vertical and horizontal ruled lines may be extracted. For example, the maximum of the widths may be extracted. In addition, the maximum of each of the widths of the vertical and horizontal ruled lines may be extracted.

The filter processing module 150 uses the filter generated by the filter generating module 140 to perform a filtering process of identifying and removing the noise contained in the ruled line for the image having the ruled line extracted by the ruled line extracting module 110 or the image having the ruled line rendered into the solid line by the solid-lining module 120. Here, the filtering process refers to removing an image within the filter as noise if all pixels at a position of the outer circumference of the filter are white when the image is scanned.

In addition, although an image within the filter is removed as noise if all pixels at a position of the outer circumference of the filter are white, the above-mentioned filter processing module 150 may identify the image as a noise candidate instead of removing it. That is, the filter processing module 150 leaves the image as a noise candidate to the end, instead of determining the image as noise, and makes a mark (tag or flag) indicating that the image is the noise candidate. In addition, the filter processing module 150 may obtain a result of identification of the noise candidate using another noise identification method (for example, detection of short segments by a simple pattern matching) and may finally determine only a location, which is determined as a noise candidate as a result of both methods, as noise. Alternatively, instead of the noise identification method, the filter processing module 150 may take one not detected as a dotted line or a dashed line as a noise candidate using a known dotted line/dashed line detection method and may finally determine only a location, which is determined as a noise candidate as a result of both methods, as noise. Then the determined noise is removed. When a more precise noise removal is performed, another noise identification method or another dotted line/dashed line detection method is used with the known method. In case where pixels at a position of the outer circumference of the filter are all white, although a method of removing an image within the filter as noise will be hereinafter described, other methods may be used with the above method.

The ruled line image generating module 160 is connected to the noise identifying/removing module 130. The ruled line image generating module 160 receives the image from which the noise contained in the ruled line is removed by the noise identifying/removing module 130 and generates a ruled line image. For example, the ruled line extracting module 110, the solid-lining module 120 and the noise identifying/removing module 130 may handle only the vertical ruled line to generate a vertical ruled line image and thereafter handle only the horizontal ruled line to generate a horizontal ruled line image, and the ruled line image generating module 160 may combine the vertical ruled line image and the horizontal ruled line image to generate a ruled line image.

Figure 2:
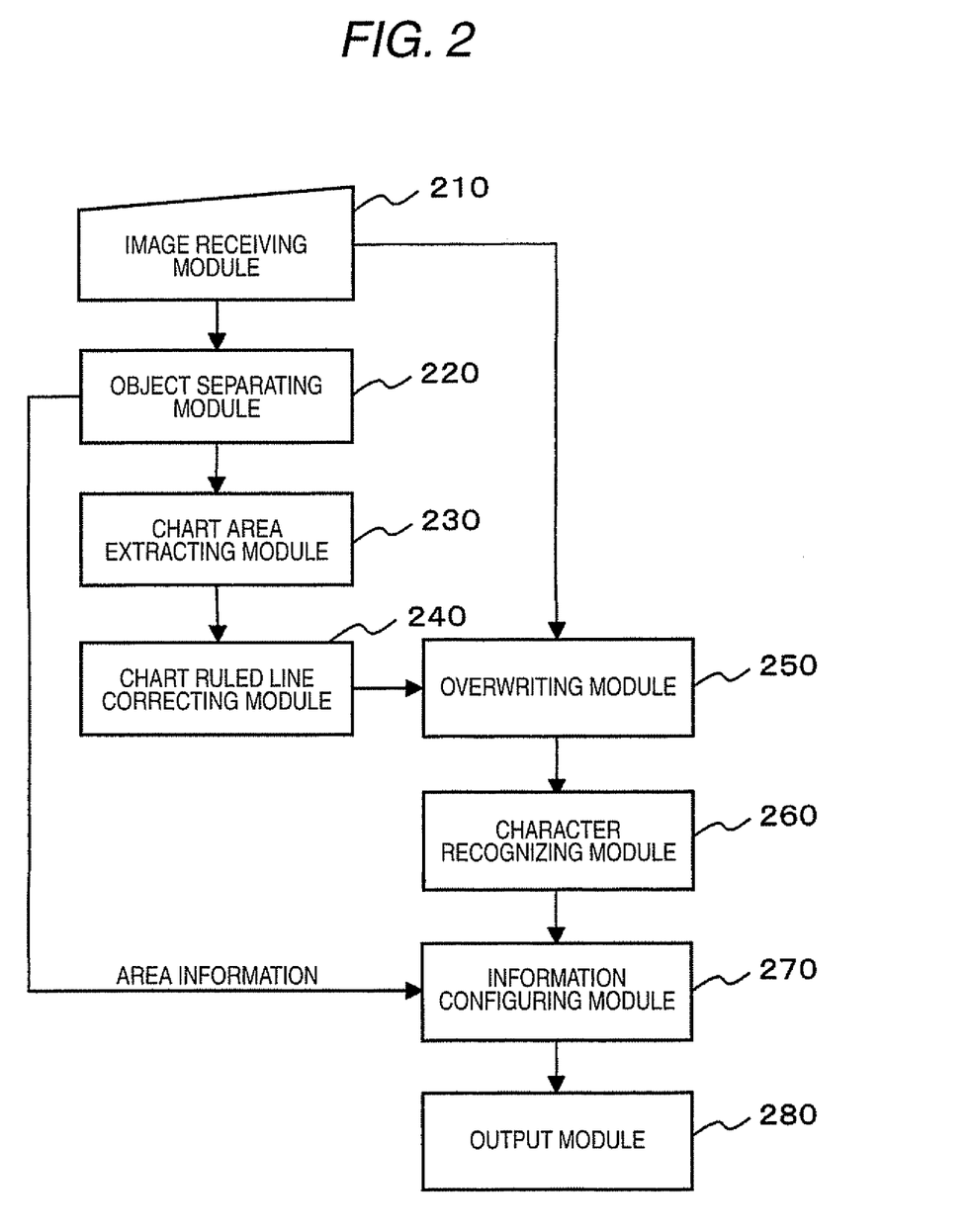
FIG. 2 is a conceptual module configuration view of an exemplary general configuration of an image processing apparatus when this exemplary embodiment is implemented.

FIG. 2 is a conceptual module configuration view of an exemplary general configuration of an image processing apparatus when this exemplary embodiment is implemented.

The image processing apparatus generally includes an image receiving module 210, an object separating module 220, a chart area extracting module 230, a chart ruled line correcting module 240, an overwriting module 250, a character recognizing module 260, an information configuring module 270 and an output module 280.

The image receiving module 210 is connected to the object separating module 220 and the overwriting module 250. The image receiving module 210 receives an image and passes it to the object separating module 220 and the overwriting module 250. Receiving an image may include, for example, reading an image from a scanner, a camera or the like, receiving an image from an external device via a communication link, such as a facsimile or the like, reading an image stored in a hard disk or the like (including one built in a computer, one connected via a network, etc.), etc. An image may be either a binary image or a continuous-tone image (color image). In case of a continuous-tone image, it is converted into a binary image through a binarizing process. The number of images to be received may be one or more. If an image contains a chart as its contents, it may be an image of a document such as a form used in business, a pamphlet for advertisement, etc.

In addition, the image receiving module 210 may perform a pre-process such as noise removal, inclination correction, normalization or the like for the received image.

The object separating module 220 is connected to the image receiving module 210, the chart area extracting module 230 and the information configuring module 270. The object separating module 220 separates the image received by the image receiving module 210 into configuration objects (sub images). The objects include at least a chart area and further include a character area, a figure area, a photograph area and so on. Then, the object separating module 220 passes a result of the separation to the chart area extracting module 230 and passes configuration information of the areas (positions of the areas in the received image, etc.) to the information configuring module 270.

The separation of the received image into the sub images is performed by extracting areas (sub images) divided by blanks and so on from the image. For example, in the process of separating the image into the sub images, the image received by the image receiving module 210 is divided based on positions at which a white pixel area having a certain length (or area) exist. Such a division allows extraction of a black pixel area (for example, a rectangular form). In addition, features (for example, an area, vertical or horizontal size, shape, position of a lump of black pixels, etc.) as an image of the black pixel area may be extracted to discriminate the kind of character area, the figure area, chart area, photograph area, etc. The sub images may be extracted using other existing methods also.

The chart area extracting module 230 is connected to the object separating module 220 and the chart ruled line correcting module 240. The chart area extracting module 230 receives the separation result from the object separating module 220 and extracts an image of the chart area from the image received by the image receiving module 210. Then, the chart area extracting module 230 passes the chart area image to the chart ruled line correcting module 240.

The chart ruled line correcting module 240 is connected to the chart area extracting module 230 and the overwriting module 250. The chart ruled line correcting module 240 is configured by the above-described module shown in FIG. 1. That is, the chart ruled line correcting module 240 receives the chart area image from the chart area extracting module 230 and extracts a ruled line constituting a chart from segments in the chart area image to generate an image having only a ruled line without noise. Then, the chart ruled line correcting module 240 passes the generated chart image to the overwriting module 250. Details of this process will be described with reference to a flow chart shown in FIG. 3.

The overwriting module 250 is connected to the image receiving module 210, the chart ruled line correcting module 240 and the character recognizing module 260. The overwriting module 250 overwrites the chart image generated by the chart ruled line correcting module 240 over the image received by the image receiving module 210. Then, the overwriting module 250 passes the image overwritten with the chart image to the character recognizing module 260. For example, the overwriting of the chart image provides an image completed by rendering a chart in the original image into a solid line. Processes after that deal with the solid-lined chart.

The character recognizing module 260 is connected to the overwriting module 250 and the information configuring module 270. The character recognizing module 260 recognizes characters in the image overwritten with the chart image by the overwriting module 250. Here, the character recognizing process may use existing character recognizing methods. In addition, the character recognizing process may include a chart structure analysis and so on. For example, an existing character recognizing program may be applied as it is, and in this case, a chart consisting of a solid ruled line other than a dotted ruled line or the like is appropriate for such a chart structure analysis. Then, the character recognizing module 260 passes the result of the character recognition to the information configuring module 270.

The information configuring module 270 is connected to the object separating module 220, the character recognizing module 260 and the output module 280. The information configuring module 270 receives the character recognition result from the character recognizing module 260 and the area configuration information from the object separating module 220 and generates the configuration information as a result of the analysis on the image. An example of the configuration information may include information indicating which character string is present in a certain position in the image, what structure a chart has, what character string is present in a cell of the chart, etc. Then the information configuring module 270 passes the generated configuration information to the output module 280.

The output module 280 is connected to the information configuring module 270. The output module 280 receives the configuration information from the information configuration module 270 and converts and outputs it into page information to be output. An example of the page information may include a format such as an Extensible Markup Language (XML) or the like. An example of the output may include storage of the page information into a document database or the like, transmission of the page information to other information processing apparatus such as a translation processing apparatus or the like, and further, printing the page information with a printing apparatus such as a printer or the like, displaying the page information on a displaying device such as a display, transmission of an image to an image transmitting apparatus such as a facsimile or the like, with the intention of presenting a fair copy of an image.

Figure 3:
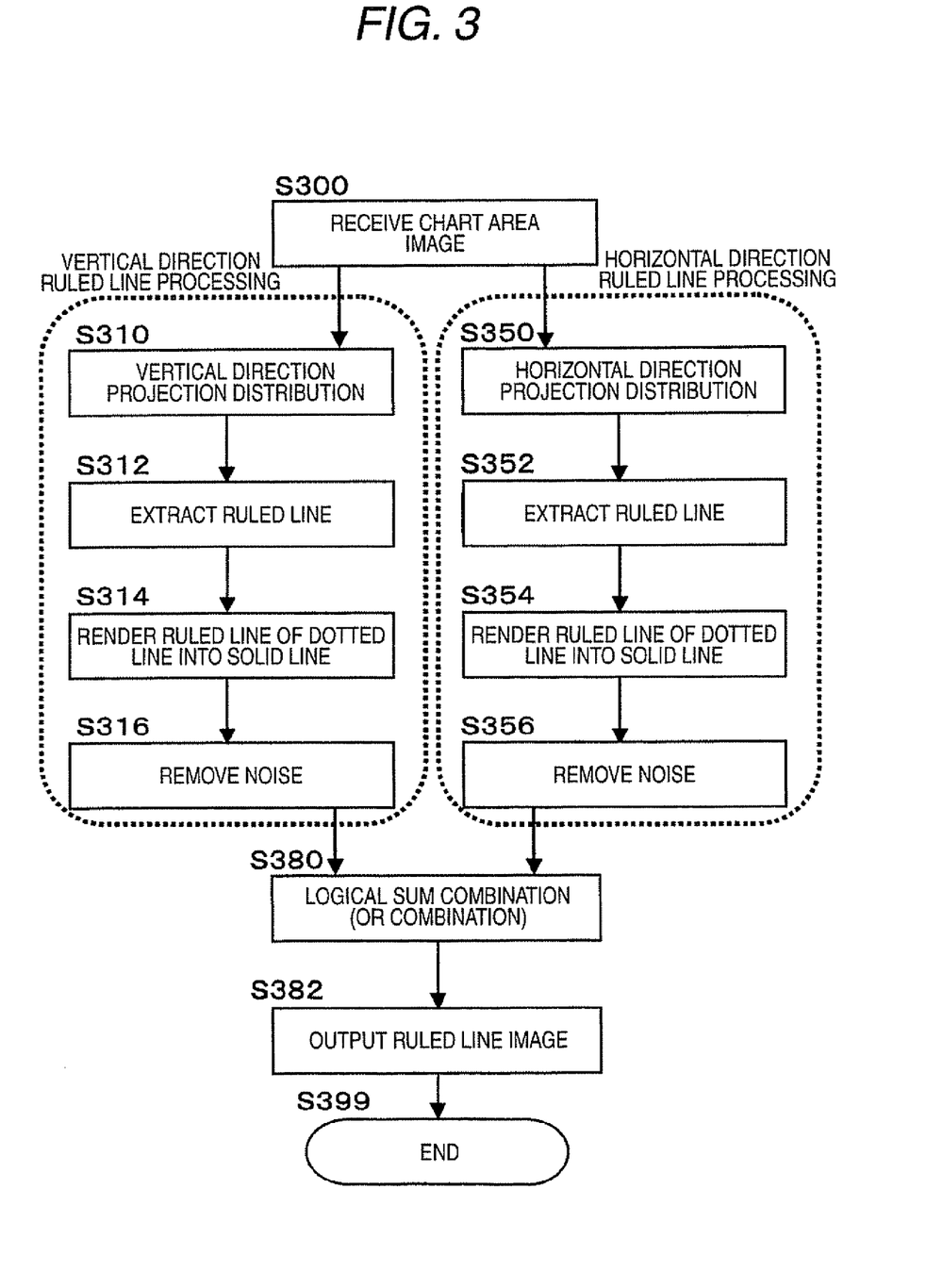
FIG. 3 is a flow chart showing an exemplary process according to this exemplary embodiment.

FIG. 3 is a flow chart showing an exemplary process according to this exemplary embodiment. This flow chart is an example of the process by the chart ruled line correcting module 240 shown in FIG. 2 and also an example of the process by the module shown in FIG. 1.

At Step S300, the chart ruled line correcting module 240 receives a chart area image from the chart area extracting module 230. Then, the received image is subjected to a lengthwise (vertical) ruled line treatment at Step S310 and a widthwise (horizontal) ruled line treatment at Step S350.

Figure 5:
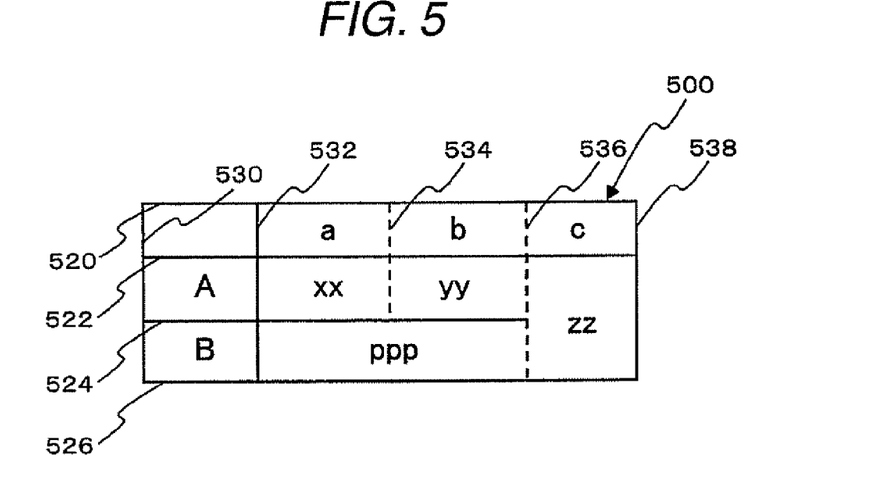
FIG. 5 is an explanatory view showing an example of a chart image taken as an object by this exemplary embodiment.

For example, such a treatment may result in a chart image 500 shown in the example of FIG. 5. The shown chart image 500 is configured by horizontal ruled lines 520 to 526 and vertical ruled lines 530 to 538. As shown in the example of FIG. 5, a character is described in each cell of the chart image 500.

Figure 6A:
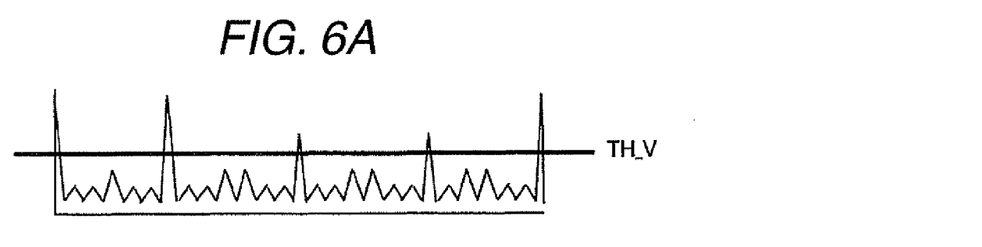
FIGS. 6A to 6C are explanatory views showing an exemplary histogram generating process according to this exemplary embodiment.
Figure 6B:
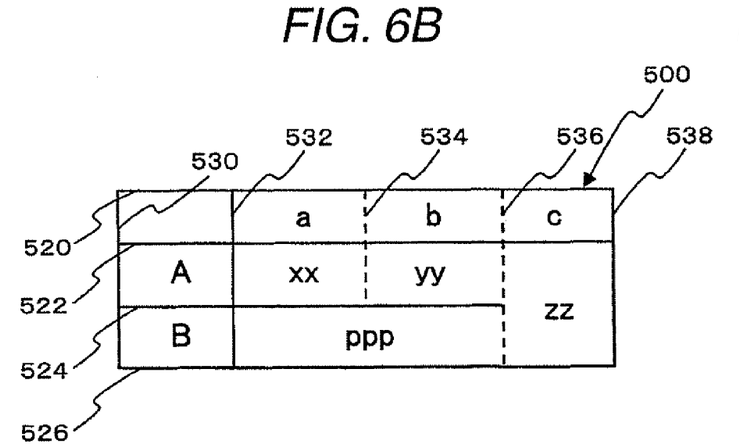

At Step S310, the ruled line extracting module 110 generates a projection distribution in the vertical direction of the chart area image received at Step S300. For example, a histogram shown in an example of FIG. 6A represents a projection distribution of the chart image 500 shown in the example of FIG. 5, in which the number of black pixels is counted in the vertical direction at each position in the horizontal direction. An example of FIG. 6B shows the chart image 500 shown in the example of FIG. 5.

Figure 7A:
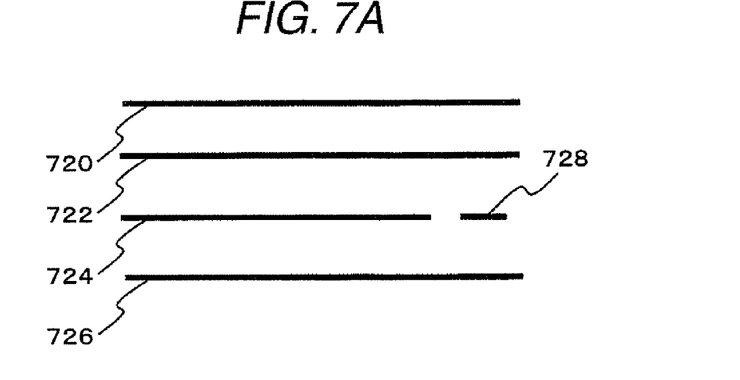
FIGS. 7A and 7B are explanatory views showing an exemplary process of erroneously extracting characters or the like as ruled lines.
Figure 7B:
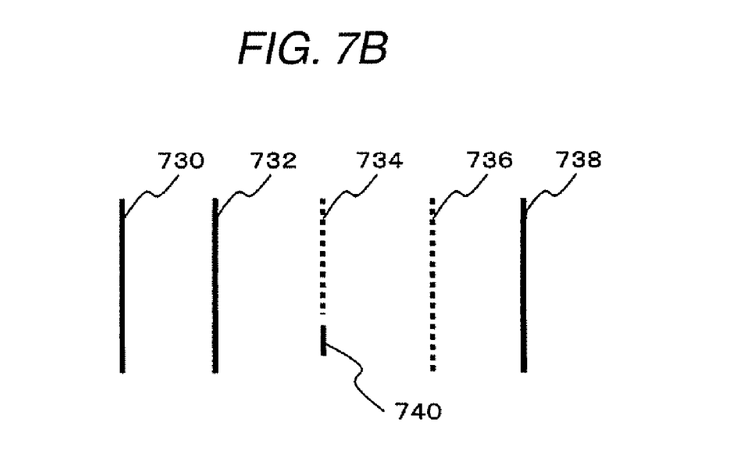

At Step S312, the ruled line extracting module 110 extracts the vertical ruled lines from the projection distribution generated at Step S310. For example, the vertical ruled lines are extracted from the histogram shown in the example of FIG. 6A, with a location of the threshold value TH_V or more as a position (in the horizontal direction) at which the vertical ruled lines exist. The vertical ruled lines shown in an example of FIG. 7B correspond to the vertical ruled lines extracted at Step S312. Vertical ruled lines 730 to 738 correspond to the vertical ruled lines 530 to 538 in the chart image 500, respectively. Misrecognized noise 740 is a character (second character p of ppp) in a cell surrounded by a horizontal ruled line 524, a horizontal ruled line 526, a vertical ruled line 532 and a vertical ruled line 536, which is extracted as a ruled line candidate. That is, the misrecognized noise 740 is produced because a portion at the location of the threshold value TH_V or more is extracted as a vertical ruled line from the projection distribution.

Figure 8A:
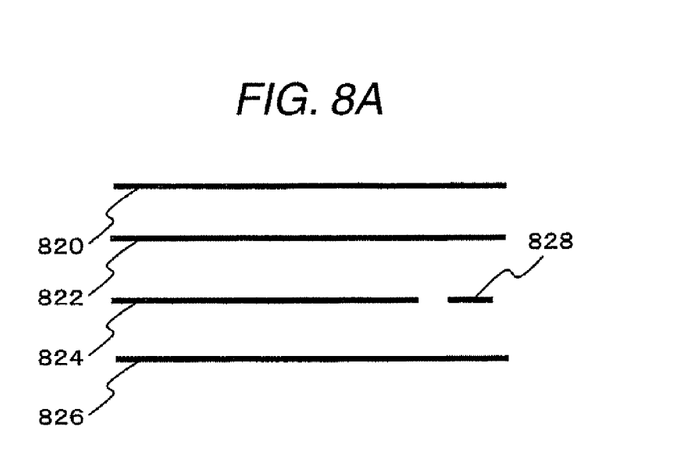
FIGS. 8A and 8B are explanatory views showing an exemplary process of rendering extracted ruled lines into solid lines.
Figure 8B:
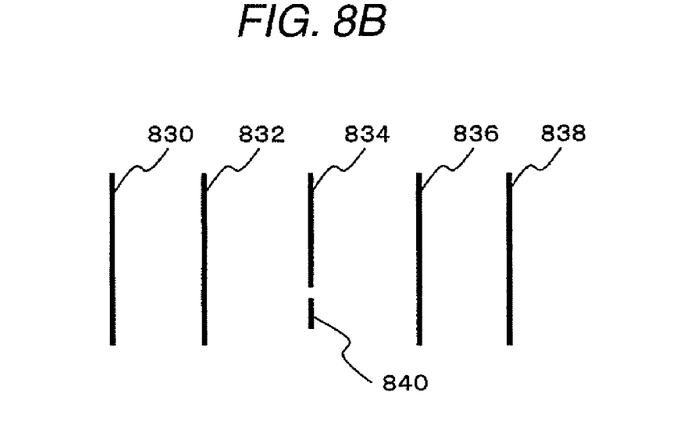

At Step S314, the solid-lining module 120 converts the vertical ruled line extracted at Step S312 into a solid line. For example, a dotted line, a dashed line or the like is rendered into a solid line through an expanding and contracting process in the vertical direction. For example, an example shown in FIG. 8B is to render the example shown in FIG. 7B into a solid line. Ruled lines of dotted lines of vertical ruled lines 734 and 736 are converted into solid lines.

At Step S316, the noise identifying/removing module 130 removes noise from the vertical ruled line rendered into the solid line. Details of this process will be described with reference to a flow chart shown in FIG. 4.

Figure 6C:
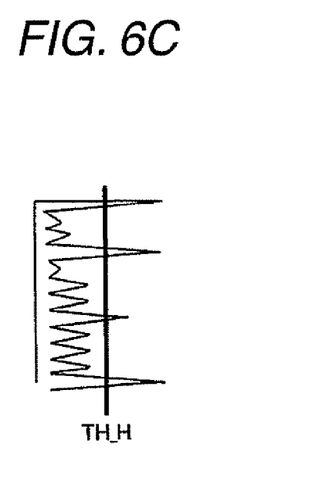

At Step S350, the ruled line extracting module 110 generates a projection distribution in the horizontal direction of the chart area image received at Step S300. For example, a histogram shown in an example of FIG. 6C represents a projection distribution of the chart image 500 shown in the example of FIG. 5, in which the number of black pixels is counted in the horizontal direction at each position in the vertical direction.

At Step S352, the ruled line extracting module 110 extracts the horizontal ruled lines from the projection distribution generated at Step S310. For example, the horizontal ruled lines are extracted from the histogram shown in the example of FIG. 6C, with a location of the threshold value TH_H or more as a position (in the horizontal direction) at which the horizontal ruled lines exist. The horizontal ruled lines shown in an example of FIG. 7A correspond to the horizontal ruled lines extracted at Step S352. The horizontal ruled lines 720 to 726 correspond to the horizontal ruled lines 520 to 526 in the chart image 500, respectively. Misrecognized noise 728 is a character (character string zz) in a cell surrounded by a horizontal ruled line 522, a horizontal ruled line 526, a vertical ruled line 536 and a vertical ruled line 538, which is extracted as a ruled line candidate. That is, the misrecognized noise 728 is produced because a portion at the location of the threshold value TH_H or more is extracted as a horizontal ruled line from the projection distribution.

At Step S354, the solid-lining module 120 converts the horizontal ruled line extracted at Step S332 into a solid line. For example, a dotted line, a dashed line or the like is rendered into a solid line through an expanding and contracting process in the horizontal direction. For example, an example shown in FIG. 8A is to render the example shown in FIG. 7A into a solid line. Since all the horizontal ruled lines are solid lines, there is no change by the process of Step S354.

At Step S356, the noise identifying/removing module 130 removes noise from the horizontal ruled line rendered into the solid line. Details of this process will be described with reference to the flow chart shown in FIG. 4.

Figure 11:
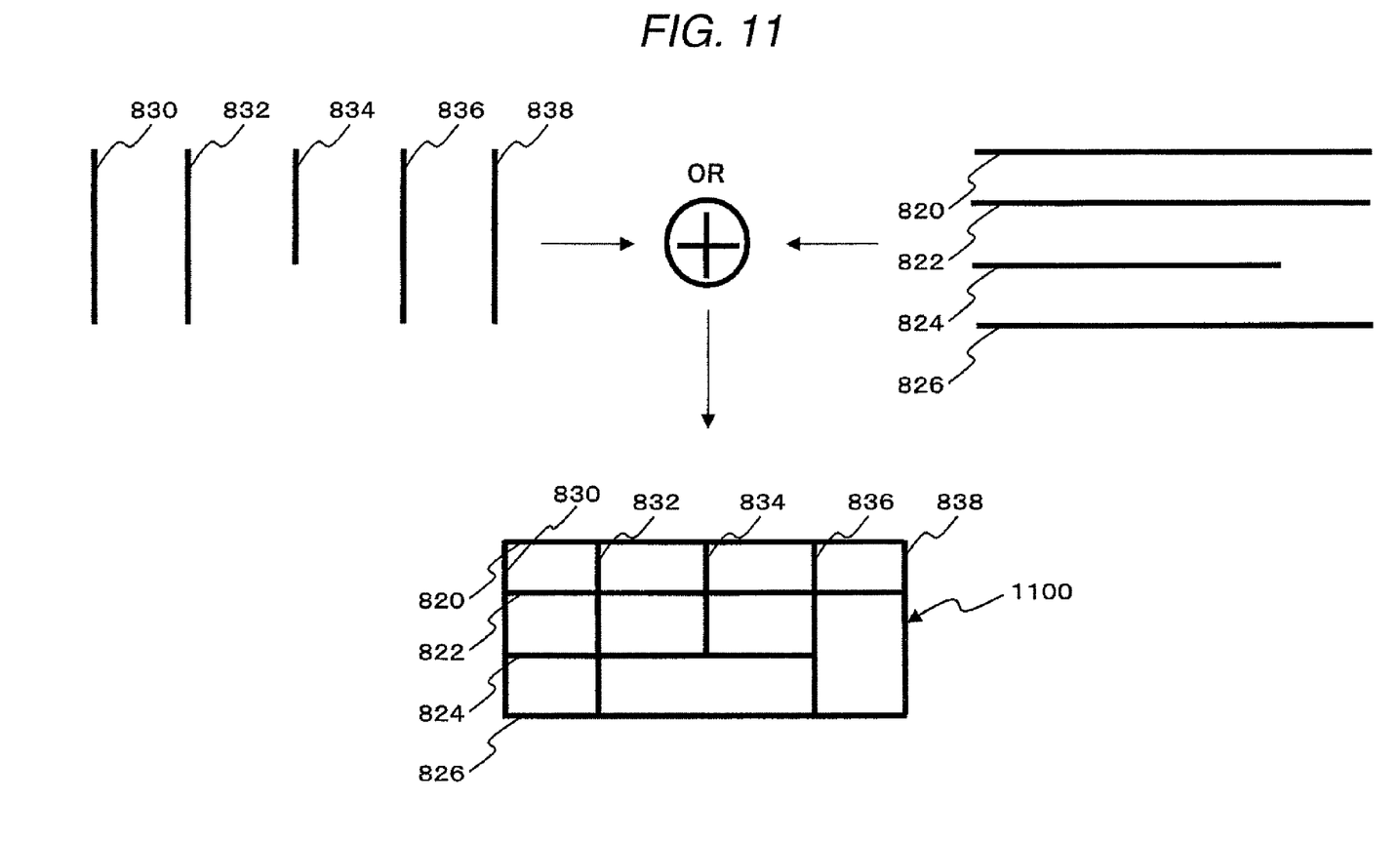
FIG. 11 is an explanatory view showing an exemplary process of generating a ruled line image according to this exemplary embodiment.

At Step S380, the ruled line image generating module 160 combines the ruled line images with noise removed therefrom at Steps S316 and S356. For example, FIG. 11 shows an example of generating a chart image 1100 configured by vertical ruled lines 830 to 838 and horizontal ruled lines 820 to 826 by ORing (logical sum) the vertical ruled lines 830 to 838 and the horizontal ruled lines 820 to 826 with noise removed therefrom.

At Step S382, the ruled line image generating module 160 outputs the ruled line image generated at Step S380 to the overwriting module 250.

Figure 12:
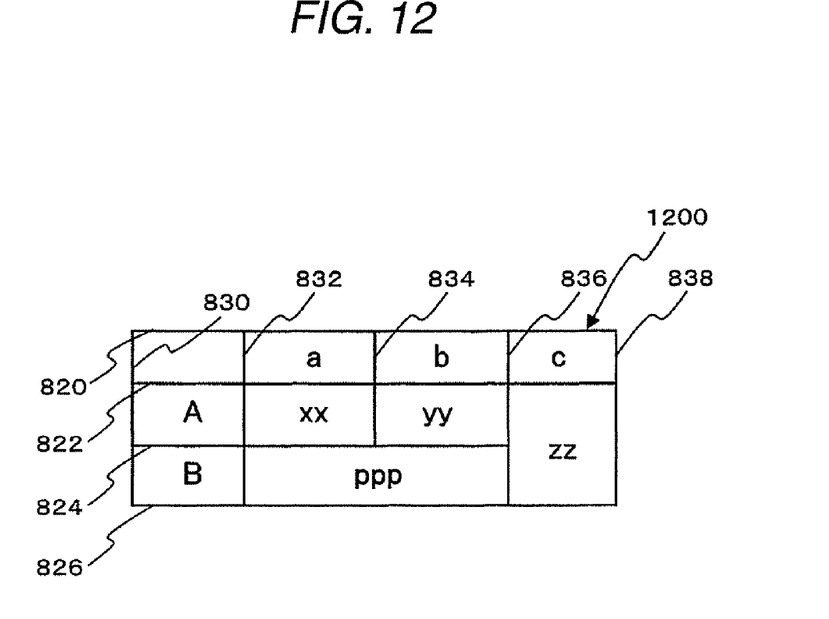
FIG. 12 is an explanatory view showing an exemplary chart image rewritten by a overwriting module.

The overwriting module 250 writes the ruled line image (image with a ruled line such as a dotted line, a dashed line or the like rendered into a solid line and with noise removed therefrom) received from the chart ruled line correcting module 240 over the original image received by the image receiving module 210. For example, the chart image 500 shown in the example of FIG. 5 is converted into a chart image 1200 shown in an example of FIG. 12. That is, characters in cells of the chart remain unchanged and ruled lines in the cells are rendered into solid lines.

Figure 4:
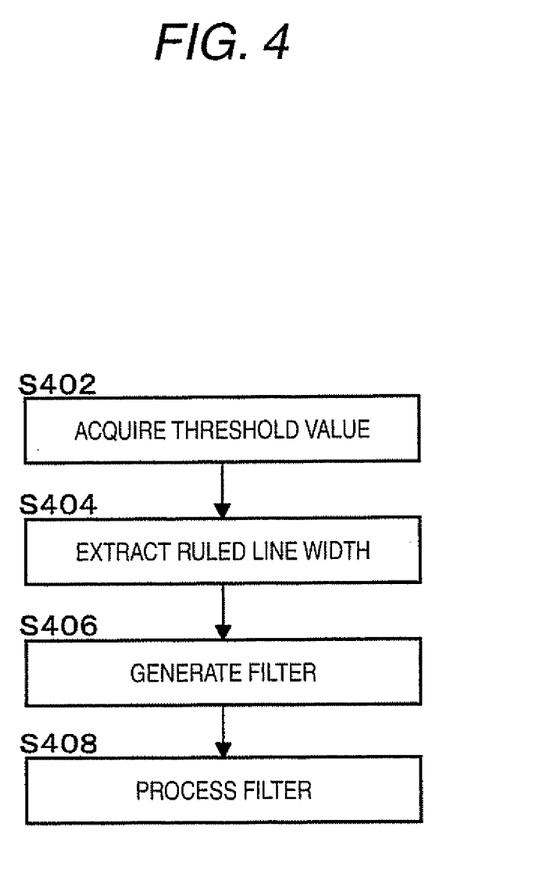
FIG. 4 is a flow chart showing an exemplary noise removing process according to this exemplary embodiment.

FIG. 4 is a flow chart showing an exemplary noise removing process according to this exemplary embodiment. That is, this is an exemplary process by the noise identifying/removing module 130 shown in the example of FIG. 1 and an exemplary process at Steps S316 and S356 shown in the example of FIG. 3.

At Step S402, the threshold acquiring module 142 acquires a threshold value used by the ruled line extracting module 110 to extract the ruled lines. For example, in the above-described example, the threshold acquiring module 142 acquires the threshold value TH_H used to extract the horizontal ruled line and the threshold value TH_V used to extract the vertical ruled line.

Figure 9A:
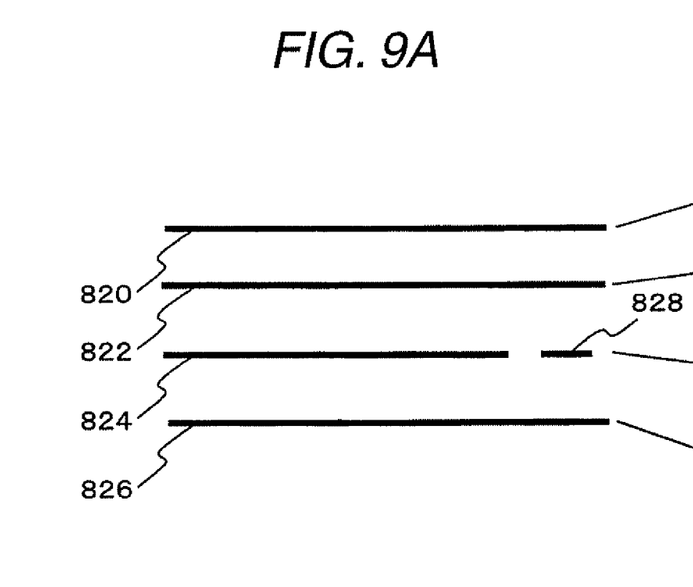
FIGS. 9A and 9B are explanatory views showing an exemplary process of extracting thickness of ruled lines.
Figure 9B:
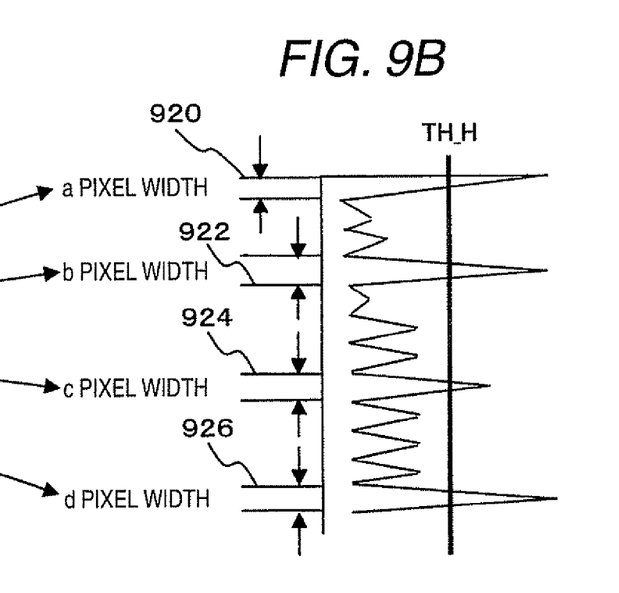

At Step S404, the ruled line width extracting module 144 extracts width of the ruled lines extracted by the ruled line extracting module 110. For example, as shown in the example of FIGS. 9A and 9B, for the horizontal ruled lines 820 to 826 and the misrecognized noise 828 shown in FIG. 9A (the same as the example shown in FIG. 8B), the ruled line width extracting module 144 extracts pixel width (a pixel width 920 to d pixel width 926) of each of locations in which the number of black pixels counted in the horizontal direction is equal to or more than the threshold value TH_H. More specifically, this module 144 counts the number of times of continuity of frequency distribution (the number of black pixels) of the threshold value TH_H or more and extracts line width. The a pixel width 920 is line width of the horizontal ruled line 820, the b pixel width 922 is line width of the horizontal ruled line 822, the c pixel width 924 is line width of the horizontal ruled line 824 and the misrecognized noise 828, and the d pixel width 926 is line width of the horizontal ruled line 826. For example, among them, the largest pixel width may be extracted as ruled line width for generating a filter.

At Step S406, the filter generating module 140 generates a filter using the threshold value acquired at Step S402 and the ruled line width extracted at Step S404. For example, the filter has a form shown in an example of FIG. 10. That is, the filter has a rectangular form having horizontal width of M pixels and vertical length of N pixels.

Figure 10:
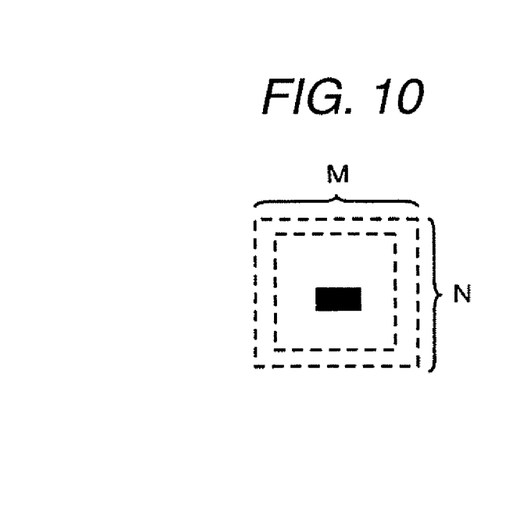
FIG. 10 is an explanatory view showing an exemplary filter generated according to this exemplary embodiment.

For example, the horizontal width M and the vertical length N of a filter for removing noise from a horizontal ruled line may be defined by the following equations (1) and (2)

$$M = \text{threshold value} \times \alpha \quad (1)$$

$$N = \text{ruled line width} \times \beta \quad (2)$$

Where, $\alpha$ and $\beta$ are parameters to adjust a filter size. For the filter for removing noise from the horizontal ruled line, $\alpha<1$ and $\beta \geq 1$. That is, the horizontal width M is smaller than the threshold value for extracting the horizontal ruled line and the vertical length N is larger than the ruled line width. The reason for this is to generate a filter configured by a side of the horizontal width M shorter than the shortest length (i.e., the threshold value) recognized as the horizontal ruled line and a side of the vertical length N longer than the ruled line width from the respect that noise has a size included in one cell and its line width does not exceed the extracted ruled line width. Here, $\alpha$ is defined to be equal to or more than line length of noise to be removed.

For example, the horizontal width M and the vertical length N of a filter for removing noise from a vertical ruled line may be defined by the following equations (3) and (4)

$$M = \text{ruled line width} \times \beta \quad (3)$$

$$N = \text{threshold value} \times \alpha \quad (4)$$

Where, $\alpha$ and $\beta$ are parameters to adjust a filter size. For the filter for removing noise from the vertical ruled line, $\alpha<1$ and $\beta \geq 1$. That is, the horizontal width M is equal to or larger than the ruled line width and the vertical length N is smaller than the threshold value for extracting the vertical ruled line. The reason for this is to generate a filter configured by a side of the horizontal width M longer than the ruled line width and a side of the vertical length N shorter than the shortest length (i.e., the threshold value) recognized as the vertical ruled line from the respect that noise has a size included in one cell and its line width does not exceed the extracted ruled line width. Here, $\alpha$ is defined to be equal to or more than line length of noise to be removed.

At Step S408, the filter processing module 150 removes noise from the ruled line images (horizontal ruled line image and vertical ruled line image) rendered into the solid line using the filter generated at Step S406. For example, when the filter is scanned above the ruled line image, if an image in the inside of a frame along the outer circumference within the filter (an area surrounded by two dotted rectangles in the example of FIG. 10) is all white, this module 150 performs a process of converting the image within the frame into white color. The frame may have either width of one pixel or width of plural pixels. In addition, the image within the frame may be converted into white color with no determination on the image. That is, the image within the frame is converted into white color even in case where it is all white. Moreover, in case where black pixels are present within the frame, they may be converted into white color.

Figure 13:
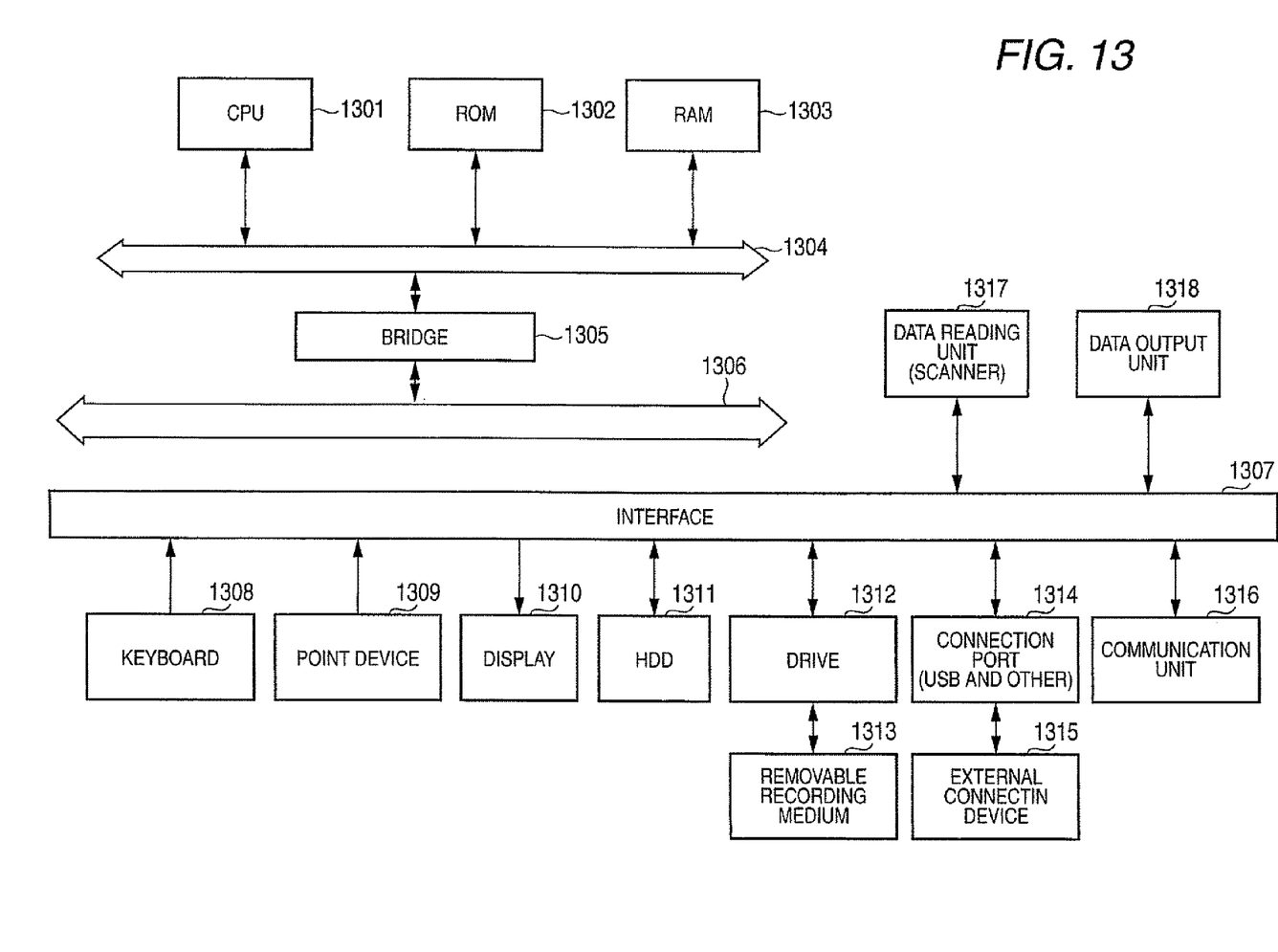
FIG. 13 is a block diagram showing an exemplary hardware configuration of a computer for implementing this exemplary embodiment.

Now, an exemplary hardware configuration of the image processing apparatus of this exemplary embodiment will be described with reference to FIG. 13. The hardware configuration shown in FIG. 13 is implemented by, for example, a personal computer (PC) or the like, including a data reading unit 1317 such as a scanner or the like and a data output unit 1318 such as a printer or the like.

A central processing unit (CPU) 1301 is a controller for executing a process according to a computer program described by an execution sequence of various modules described in the above exemplary embodiment, such as the ruled line extracting module 110, the solid-lining module 120, the noise identifying/removing module 130, the ruled line image generating module 160 and so on.

A read only memory (ROM) 1302 stores programs, operation parameters and so on used by the CPU 1301. A random access memory (RAM) 1303 stores programs used for execution by the CPU 1301, parameters properly changed for the execution, etc. These memories are interconnected via a host bus 1304 such as a CPU bus or the like.

The host bus 1304 is connected to an external bus 1306 such as a peripheral component interconnect/interface (PCI) bus or the like via a bridge 1305.

A point device 1309 such as a keyboard 1308, a mouse or the like is an input device manipulated by an operator. A display 1310 displays various kinds of information as text or image information, such as a liquid crystal display, a cathode ray tube (CRT) or the like.

A hard disk drive (HDD) 1311 contains a hard disk and drives the hard disk to record or reproduce programs or information executed by the CPU 1301. The hard disk stores a received image, a result of count of black pixels, etc. In addition, the hard disk stores various kinds of computer programs such as data processing programs.

A drive 1312 reads data or programs recorded in a removable recording medium 1313 mounted thereon, such as a magnetic disk, an optical disk, a magneto-optical disk, a semiconductor memory or the like, and supplies the read data or programs to the RAM 1303 via an interface 1307, the external bus 1306, the bridge 1305 and the host bus 1304. The removable recording medium 1313 may also be used as the same data recording region as the hard disk.

A connection port 1314 is a port which is connected to an external connection device 1315 and includes a connection such as USB, IEEE1394 or the like. The connection port 1314 is also connected to the CPU 1301 and so on via the interface 1307, the external bus 1306, the bridge 1305, the host bus 1304 and so on. A communication unit 1316 is connected to a network for conducting data communication with the external. The data reading unit 1317 is, for example, a scanner for reading a document. The data output unit 1318 is, for example, a printer for outputting document data.

The hardware configuration of the image processing apparatus shown in FIG. 13 is only by way of example, and the above-described exemplary embodiment is not limited to the hardware configuration shown in FIG. 13 but may have any configuration as long as it can execute the modules described in the above-described exemplary embodiment. For example, some modules may be configured as a dedicated hardware (for example, ASIC (Application Specific Integrated Circuit) or the like), some modules may be connected via a communication link with an external system, and additionally a plurality of the systems shown in FIG. 13 may be interconnected via a communication link to cooperate between them. In addition, the hardware configuration may be assembled in a copier, a facsimile, a scanner, a printer, a multifunction copier (image processing apparatus having two or more of functions of a scanner, a printer, a copier and a facsimile and the like).

Although a midway-cut ruled line has been illustrated with a dotted line and a dashed line in the above exemplary embodiment, it may be an alternate long and short dashed line, an alternate long and two short dashed line or the like.

In addition, although the received image is simultaneously subjected to Step S310 and Step S350 branched from Step S300 in the flow chart shown in the example of FIG. 3, the received image may be rotated by 90 degrees after being subjected to the process from Step S310 to Step S316, and then may be again subjected to the process from Step S310 to Step S316.

Although the terms "equal to or larger than", "equal to or smaller than", "larger than" and "smaller than" are used in the above-described exemplary embodiment, they may be replaced with "larger than", "smaller than", "equal to or larger than" and "equal to or smaller than", respectively, as long as the combinations thereof are not contradictory.

The above-described program may be stored in a recording medium or may be provided by a communication unit. In this case, for example, the above-described program may be understood as the invention of "computer-readable recording medium having a program recorded therein."

"Computer-readable recording medium having a program recorded therein" refers to a computer-readable recording medium having a program recorded therein, which is used for installation, execution, distribution and so on of the program.

The recording medium may include, for example, a digital versatile disc (DVD) such as "DVR-R, DVD-RW, DVD-RAM and the like", which are a standard specified by DVD Forum, and "DVD+R, DVD+RW and the like", which are a standard specified as DVD+RW, a compact disc (CD) such as read-only memory (CD-ROM), CD recordable (CD-R), CD rewritable (CD-RW) or the like, a blue-ray disc (trademark), a magneto-optical disc (MO), a flexible disc (FD), a magnetic tape, a hard disk, a read only memory (ROM), an electrically erasable programmable read-only memory (EEPROM), a flash memory, a random access memory (RAM), etc.

The program or a part thereof may be recorded in the recording medium for storage and distribution. In addition, the program or a part thereof may be transmitted via a communication unit, for example, a transmission medium such as a wired network or a wireless network used for a local area network (LAN), metropolitan area network (MAN), wide area network (WAN), Internet, intranet, extranet and so on, or further a combination thereof, or may be carried using a carrier wave.

The program may be a part of other program or may be recorded in the recording medium along with a separate program. In addition, the program may be divided and recorded in a plurality of recording media. In addition, the program may be recorded in any form including compression, encryption and so on as long as it can be reproduced.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising at least one processor; and
   at least one memory, the memory storing instructions which when executed by the at least one processor cause the at least one processor to function as:
   a ruled line extracting unit that counts the number of pixels within an image, compares the counted number of pixels with a threshold value, and extracts a ruled line based on a result of the comparison; and
   an identifying unit that identifies a noise component in the ruled line extracted by the ruled line extracting unit based on thickness of the ruled line extracted by the ruled line extracting unit and the threshold value the identifying unit generating one of:
   (1) a filter having a horizontal width equal to the threshold value multiplied by $\alpha$, and has a vertical length equal to the ruled line width multiplied by $\beta$; and
   (2) a filter having a horizontal width equal to the ruled line width multiplied by $\beta$, and has a vertical length equal to the threshold value multiplied by $\alpha$,
   wherein $\alpha<1$, and $\beta\geq 1$.

2. The image processing apparatus according to claim 1, further comprising:
   a solid-lining unit that converts the ruled line extracted by the ruled line extracting unit into a solid line, wherein the identifying unit identifies the noise component in the ruled line converted into the solid line by the solid-lining unit.

3. The image processing apparatus according to claim 2, wherein the filter generated by the identifying unit has a rectangular form and the length of the rectangular form is determined based on the thickness of the ruled line extracted by the ruled line extracting unit.

4. The image processing apparatus according to claim 2, wherein the filter generated by the identifying unit has a rectangular form and the length of the rectangular form is determined based on the threshold value.

5. The image processing apparatus according to claim 1, further comprising:
   a solid-lining unit that converts the ruled line extracted by the ruled line extracting unit into a solid line,
   wherein the identifying unit identifies the noise component in the ruled line converted into the solid line by the solid-lining unit.

6. A non-transitory computer readable medium storing a program causing a computer to execute a process for image processing, the process comprising:
   counting the number of pixels within an image;
   comparing the counted number of pixels with a threshold value;
   extracting a ruled line based on a result of the comparison;
   identifying a noise component in the extracted ruled line based on thickness of the extracted ruled line extracted and the threshold value; and
   generating one of:
      (1) a filter having a horizontal width equal to the threshold value multiplied by $\alpha$, and has a vertical length equal to the ruled line width multiplied by $\beta$; and
      (2) a filter having a horizontal width equal to the ruled line width multiplied by $\beta$, and has a vertical length equal to the threshold value multiplied by $\alpha$,
   wherein $\alpha<1$, and $\beta\geq 1$.

7. The non-transitory computer readable medium according to claim 6, further comprising:
   converting the extracted ruled line into a solid line,
   wherein identifying the noise component includes identifying the noise component in the ruled line converted into the solid line.

8. The non-transitory computer readable medium according to claim 7,
wherein the generated filter has a rectangular form and the length of the rectangular form is determined based on the thickness of the extracted ruled line.

9. The non-transitory computer readable medium according to claim 6, the process further comprising:
   converting the extracted ruled line into a solid line,
   wherein identifying the noise component includes identifying the noise component in the ruled line converted into the solid line.

10. An image processing apparatus comprising at least one processor: and at least one memory, the memory storing instructions which when executed by the at least one processor cause the at least one processor to function as:
   a horizontal ruled line extracting unit that counts the number of pixels within a horizontal direction at each position of a vertical direction of an image, compares the counted number of pixels with a horizontal threshold value, and extracts a horizontal ruled line based on a result of the comparison;
   a vertical ruled line extracting unit that counts the number of pixels within the vertical direction at each position of the horizontal direction of an image, compares the counted number of pixels with a vertical threshold value, and extracts a vertical ruled line based on a result of the comparison;
   a horizontal identifying unit that identifies a noise component in the horizontal ruled line extracted by the horizontal ruled line extracting unit based on thickness of the horizontal ruled line extracted by the horizontal ruled line extracting unit and the horizontal threshold value; and
   a vertical identifying unit that identifies a noise component in the vertical ruled line extracted by the vertical ruled line extracting unit based on thickness of the vertical ruled line extracted by the vertical ruled line extracting unit and the vertical threshold value,
   wherein the horizontal identifying unit and the vertical identifying unit generate one of:
      (1) a filter having a horizontal width equal to the threshold value multiplied by $\alpha$, and has a vertical length equal to the ruled line width multiplied by $\beta$; and
      (2) a filter having a horizontal width equal to the ruled line width multiplied by $\beta$, and has a vertical length equal to the threshold value multiplied by $\alpha$, wherein $\alpha<1$, and $\beta\geq 1$.

* * * * *